United States Patent [19]

Schilling, Jr. et al.

[11] 4,150,048
[45] Apr. 17, 1979

[54] NONHYDROLYZABLE SILOXANE BLOCK COPOLYMERS OF ORGANOSILOXANES AND ORGANIC ETHERS

[75] Inventors: Curtis L. Schilling, Jr., Croton-on-Hudson; C. Scott Eschbach, Stormville, both of N.Y.

[73] Assignee: Union Carbide Corporation, New York, N.Y.

[21] Appl. No.: 891,044

[22] Filed: Mar. 28, 1978

[51] Int. Cl.$^2$ .............................................. C09F 7/08
[52] U.S. Cl. .................. 260/448.2 B; 260/448.2 E; 521/112; 521/174
[58] Field of Search .................. 260/448.2 B, 448 LE

[56] References Cited

U.S. PATENT DOCUMENTS

| | | | |
|---|---|---|---|
| 3,233,986 | 2/1966 | Morehouse | 260/448.2 B X |
| 3,280,160 | 10/1966 | Bailey | 260/448.2 B |
| 3,381,019 | 4/1968 | Morehouse | 260/448.2 B X |
| 3,414,604 | 12/1968 | Pepe et al. | 260/448.8 R |
| 3,842,112 | 10/1974 | Omietanski et al. | 260/448.2 B |
| 3,879,433 | 4/1975 | Omietanski et al. | 260/448.2 B |
| 3,957,843 | 5/1976 | Bennett | 260/448.2 E X |
| 4,059,605 | 11/1977 | Bennett | 260/448.2 B |

Primary Examiner—Paul F. Shaver
Attorney, Agent, or Firm—Richard J. Gallagher

[57] ABSTRACT

Organic ethers including polyethers having two $CH_2=C(R)CH_2-$ end groups per molecule wherein R is a monovalent hydrocarbon group are reacted with organohydrosiloxanes under hydrosilation reaction conditions in the presence of a platinum catalyst preferably a neutral platinum catalyst, to form very useful nonhydrolyzable siloxane block copolymers. Novel nonhydrolyzable linear block copolymers substantially free of silicon-bonded hydrogen are obtained with linear dihydropolyorganosiloxane reactants and linear ethers or polyethers. The linear block copolymers made with the linear dihydrosiloxanes and polyethers are particularly useful as surfactants and foam stabilizers for the preparation of polyurethane foams. The very low degree (if any) of isomerization of the $CH_2=C(R)CH_2-$ group to unreactive species during the hydrosilation reaction results in the unexpectedly high molecular weight of the copolymers of the present invention.

20 Claims, No Drawings

NONHYDROLYZABLE SILOXANE BLOCK COPOLYMERS OF ORGANOSILOXANES AND ORGANIC ETHERS

BACKGROUND OF THE INVENTION

1. Field of the Invention

The invention relates both to novel, improved, nonhydrolyzable block copolymers of siloxanes and organic ethers, preferably, polyethers which are either branched or linear in structure and to novel methods for making the copolymers. The invention also relates to novel improved methods for making urethane foams using said novel improved copolymers as surfactants or foam stabilizers.

2. Description of the Prior Art

Certain types of nonhydrolyzable siloxane-polyether copolymers are well known and are readily available articles of commerce. The siloxane polyether copolymers contained in the above products are made by the co-reaction of poly(dimethyl-siloxanes) containing SiH groups (hydrosiloxanes) with olefinic polyethers wherein the olefinic sites are allyl groups. The general reaction whereby these nonhydrolyzable linkages are created between silicone and polyether groups is:

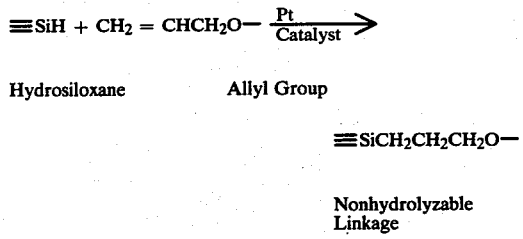

However, the above reaction is not the sole reaction which occurs during the preparation of the copolymer. It has been established that a significant percentage of the allyl groups are isomerized under the addition reaction conditions to propenyl groups. The latter react very slowly, if at all, with the SiH groups of the hydrosiloxane reactants:

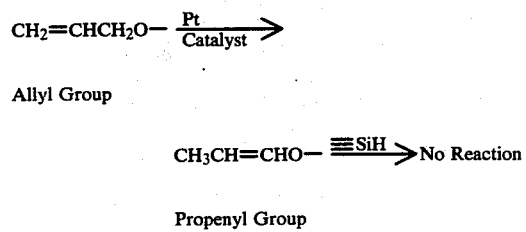

See, for example U.S. Pat. Nos. 3,507,923 and 3,836,560 (col. 10). It has become accepted practice within the industry to use stoichiometric excesses (20 mole % or more) of allyl polyethers to insure reactions of all the ≡SiH groups, or to scavenge the residual ≡SiH groups with a non-polyether reactant such as methanol or ethylene. The excess unreacted or isomerized allyl polyether is thus present as diluent, reducing thereby the potency or active concentration of the final polymer.

In U.S. Pat. No. 3,507,923 the patentees disclose that the capping of methallyl alcohol started oxyalkylene polymers results in minimization of the undesirable formation of isobutenyl groups ($CH_3$—$C(CH_3)$=CH—) from the methallyl groups ($CH_2$=$C(CH_3)$—$CH_2$—). However, there is no disclosure that the methallyl groups show a lower degree of isomerization than do allyl groups during hydrosilation. Based on the teachings of this patent, the skilled worker could expect that methallyl groups would behave in a manner similar to allyl groups under hydrosilation conditions.

Siloxane polyether copolymers containing —$CH_2CH(CH_3)CH_2$— linkages between siloxane and polyether groups have been prepared by the reaction of sodium polyether alkoxides and chloroisobutyl silicones (see U.S. Pat. No. 3,414,604 to E. J. Pepe and B. Kanner, Chem. Absts., 65, 17002c (1966)). A similar approach, using chloroisobutyl silicones and polyether carboxylate salts, has yielded copolymers with —$CH_2CH(CH_3)CH_2O_2CCH_2$— groups between silicone and polyether blocks (see Ger. Offen. 1,961,501, Chem. Absts., 73 78069f (1970)). Several Japanese patents disclose more typical nonhydrolyzable pendant copolymer preparations from polyhydrosiloxanes and allyl or methallyl methoxy polyalkylene glycols (see Jap. Kokai 74 40,398, Chem. Absts. 83, 59945d (1975) and Jap. Kokai 74 52,297, Chem. Absts. 82, 17934y (1975)). See also U.S. Pat. No. 3,381,019 which discloses the addition reaction between an alkenyl ether and a siloxane containing silanic hydrogen. Other patents mentioning —$CH_2CH(CH_3)CH_2$— groups between silicone and polyether blocks, or methallyloxy-groups, include U.S. Pat. Nos. 3,233,968; 3,280,160; 3,507,815; 3,445,276; 3,663,468 (Example 5); 3,741,917; 3,796,676; 3,794,673 and 3,867,188. U.S. Pat. No. 3,652,629 to Imperial Chemical Industries discloses copolymers in which siloxane and polyether groups are joined by —$CH_2CH(CH_3)CH_2N$—$(CH_2CH_3)CO$— linkages, prepared by hydrosilation of polyethers capped with a $CH_2$=$C(CH_3)CH_2N(CH_2CH_3)CO$— group. However, none of these references disclose any advantage to using methallyl polyethers in preparing siloxane polyether copolymers either in higher yields or potency or with improved properties.

While it is known that other unsaturated polyethers containing nonisomerizable olefinic groups permit preparation of siloxane-polyether copolymers with low molar excesses of unsaturated polyether, these nonisomerzable olefinic groups are not amenable to incorporation in polyethers at both ends. For example, compounds containing norbornenyl groups (see U.S. Pat. No. 3,798,253, Ger. Offen. 2,301,789, Chem. Absts., 80, 109290x (1974)) or tertiary acetylenic groups (see Ger. Offen. 2,215,393, Chem. Absts., 78, 17121y (1973)), tertiary vinyl groups (see U.S. Pat. Nos. 3,957,843 and 4,059,605) can be used as polyether starters, but the same or equivalent compounds cannot be used as polyether capping groups. Accordingly, these disclosures are not helpful in preparing nonhydrolyzable $(AB)_n$ block copolymers in the fashion taught by this invention. Other patents which disclose the non-isomerizable nature of norbornenyl groups, tertiary acetylenic groups and tertiary vinyl groups but which do not disclose siloxane-polyether block copolymers are U.S. Pat. Nos. 4,033,990; 3,842,112; 3,933,695 and 3,879,433. The disclosure of these patents provide no teachings, suggestions, or means which would enable the preparation of nonhydrolyzable $(AB)_n$ block copolymers as taught by the present invention.

It is also known that linear siloxane polyether block copolymers having an $(AB)_n$ structure can be prepared by reactions of dihydrosiloxanes with diallyl compounds. The methods make use of the ≡SiH/allyl group reaction. In such work, the dimethylsilicone contains only two ≡SiH groups located either terminally or internally in each molecule. For example, in U.S. Pat. No. 2,970,150 to D. L. Bailey (Example 16) MD'₂M (D'=OSiEtH—) and diallyl ether are reacted to form a polymer. In U.S. Pat. No. 3,836,560 to B. Prokai et al dihydropolysiloxanes with terminal ≡SiH groups have been reacted with diallyl polyethers to yield linear siloxane polyether block copolymers. The general reaction requires exact 1:1 stoichiometry for attainment of high molecular weights. (See U.S. Pat. No. 3,836,560, col. 10, lines 60–73 and note U.S. Pat. No. 3,280,160, Example 2). The general reaction is:

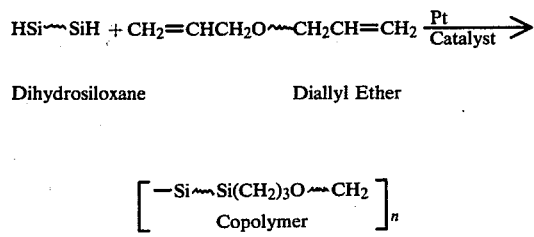

Dihydrosiloxane    Diallyl Ether

Copolymer

The above-mentioned isomerization of allyl groups to propenyl groups destroys the 1:1 stoichiometry and acts as a termination reaction, limiting the value of n in the general reaction to about 10, and correspondingly placing severe limitations on the maximum molecular weight which can be attained.

Thus, the copolymers made from diallyl polyethers in U.S. Pat. No. 3,836,560 do not achieve the high molecular weights of their hydrolyzable analogues (see U.S. Pat. No. 3,792,073 to B. Prokai) and do not show the corresponding desirable foam performance properties of their hydrolyzable analogues.

Linear siloxane-polyether copolymers of high molecular weight have very useful properties as surfactants for the preparation of mechanically frothed urethane foam (U.S. Pat. No. 3,792,073) or of open-celled rigid urethane foam (U.S. Pat. No. 3,793,237). The desirable foam performance properties of these copolymers are derived from their high molecular weight. The utilization of such products have been somewhat limited by the fact that the only high molecular weight linear silicone-polyether block copolymers available in commercial quantities are hydrolyzable in nature, i.e., the siloxane and polyether groups are connected by ≡SiOC≡ bonds. These linkages are subject to hydrolysis by contained or atmospheric moisture, yielding silanol and alcohol groups and reducing the molecular weight of the product. The general hydrolysis reaction occurring is:

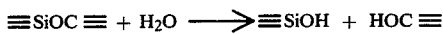

Hydrolyzable  Water  Silanol  Alcohol
Linkage

Since performance of these products in dependent on their high molecular weight, they possess severe long term stability limitations under normal conditions, and cannot for example, be employed in premixed urethane foam formulations containing water or any other aqueous systems without breaking down.

In U.S. Pat. Nos. 3,716,517 and 3,716,518 siloxane copolymers are produced by the copolymerization of an oleophobic monomer and a hydrophilic monomer. The copolymers are applied to textiles to impart soil repellency and soil releasability thereto. One type of hydrophilic monomer used contains two silyl groups (Formula IV) which are joined to a polyoxyalkylene unit by groups (R''' and R'''') which may be isobutylene groups such as are derived from methallyl groups by reaction with hydrosiloxanes. However, there is no disclosure as to any advantage in using dimethallyl polyethers in preparing silicone-polyether copolymers in higher yields, higher molecular weights, or with improved properties for producing polyurethane foams. In fact, the process patents do not even involve a hydrosilation reaction between an organohydrosiloxane and a dimethallylpolyether. The polyethers in the processes of these two patents are reacted with hydrogen-containing silanes to form the hydrophilic monomers. These monomers and the oleophobic monomers are then mixed and subjected to a hydrolysis reaction to form the siloxane copolymers. In addition, the copolymers obtained contain substituents on the silicon atoms of the oleophobic portion which require a divalent bridging group (Z) linked at one end to a perfluoroalkyl group and at the other end to a —(CH₂)ᵦ group.

It is shown hereinbelow that the use of organic ethers or polyethers having two $CH_2=C(R)CH_2$— end groups per molecule (wherein R is a monovalent hydrocarbon, most preferably methyl), as compared to diallyl ethers or polyethers results in the preparation of improved siloxane-ether copolymers having higher degrees of polymerization and higher molecular weights and low or substantially no silicon-bonded hydrogen therein, unexpectedly due to no, or only slight, isomerization of the $CH_2=C(R)CH_2$— end groups to unreactive species during hydrosilation. It is also shown that the use of linear polyethers having two said $CH_2=C(R)CH_2$— end groups in reactions with linear dihydrosiloxanes in the presence of a neutral platinum catalyst results in the preparation of higher molecular weight nonhydrolyzable linear siloxane-polyether block copolymers than are attainable with diallyl polyethers. It will also be a purpose of this disclosure to teach that such copolymers, which are novel compositions of matter, can be made with molecular weights and foam performance properties equivalent to the hydrolyzable, commercial products disclosed in U.S. Pat. No. 3,792,073, and that their hydrolytic stability is much greater than the commercial products disclosed in U.S. Pat. No. 3,792,073.

The 1968 Russian article by K. A. Andrianov et al., IAN SSSR 351, entitled "Reaction of 1,3-Dihydromethyl-disilazanes and 1,3-Dihydrotetramethyl-disiloxane With Allylamines" discloses the production of higher molecular weight copolymers from 1,3-dihydrotetramethyldisiloxane and ethyldiallylamine in the presence of platinum on carbon catalyst as compared to the molecular weight of the copolymers made from the same reactants in the presence of a chloroplatinic acid hexahydrate catalyst; but it fails to disclose block copolymers made from ethers or polyethers having two hydrocarballyl groups.

SUMMARY OF THE INVENTION

This invention is based in part on the novel and unexpected discovery that $CH_2=C(R)CH_2$ groups (hereinafter called hydrocarballyl groups), wherein R is a monovalent hydrocarbon group, undergo hydrosilation reactions with $\equiv SiH$ groups in much cleaner fashion and in higher yields than do allyl groups. Since the $\equiv SiH/CH_2=C(R)CH_2-$ group reaction is cleaner, higher molecular weight nonhydrolyzable siloxane-organic ether copolymers having substantially no silicon-bonded hydrogen and in most cases having higher degrees of polymerization than prior art block copolymers made with corresponding allyl end-blocked polyethers can be prepared with less excess olefinic ether. The nonhydrolyzable siloxane-organic ether block copolymers of this invention have degrees of polymerization, $\overline{DP}_n$, of 15 or greater and preferably 18 or more, the term "degree of polymerization" meaning the average sum of the numbers of siloxane blocks and organic ether blocks per molecule of said copolymers. These copolymers are accordingly higher in active concentration and more potent, for example, in foam use applications in the case of the linear siloxane-polyether block copolymers as compared to corresponding block copolymers made with allyl end-blocked polyethers. Higher yields of active copolymers are obtained in batch commercial processes because less or no excess olefinic polyether is used. This invention thus provides novel processes whereby such improved copolymers are prepared, with inherently lower or no excesses of organic ether or polyether being a key point in such processes. The present invention also provides novel high molecular weight nonhydrolyzable polysiloxane-organic ether block copolymers wherein ether or polyether blocks having two $-CH_2CH(R)CH_2-$ end groups are bonded to siloxane blocks by silicon to carbon bonds. These polysiloxanes therefore contain a $-CH_2CH(R)CH_2-$ linkage between the silicone and the ether oxygen in the case of monoethers and the polyether blocks in the case of polyethers. Preferred siloxane-organic ether block copolymer compositions of this invention contain essentially no silicon-bonded hydrogen atoms.

More particularly, the novel and unexpected discovery of the low degree of isomerization of ethers and polyethers having $CH_2=C(R)CH_2-$ end groups during hydrosilation permits the preparation of high molecular weight nonhydrolyzable linear silicone-polyether copolymers of the $(AB)_n$ structure. These linear copolymers are novel compositions of matter, with properties unattainable by prior art approaches. The linear copolymers are obtained by reacting linear dihydropolyorganosiloxanes with linear ethers or polyethers having $CH_2=C(R)CH_2-$ end groups. The term linear as used herein is intended to include structures comprising a "backbone" and monovalent hydrocarbon or halogen substituted hydrocarbon groups pendant from said "backbone" and to this extent includes branched linear siloxanes, ethers or polyethers and block copolymers.

This invention is also based in part on the use of the silicone-polyether copolymers herein described, either pendant or linear in structure, as surfactants or foam stabilizers in the preparation of various types of urethane foams, including flexible, rigid, high resiliency, polyester, semiflexible, mechanically frothed, or microcellular urethane foams.

The siloxane-polyether copolymers of the present invention can be used in water systems as wetting agents, thickeners, and emulsifiers. They are particularly suited for incorporation in aerosol shaving cream formulations and other aqueous systems.

DETAILED DESCRIPTION OF THE INVENTION

The siloxane-ether block copolymers of this invention are nonhydrolyzable copolymers of an organohydrosiloxane and an organic ether (including polyethers) having two olefinic end groups of the formula $CH_2=C(R)CH_2-$ (hereinafter called hydrocarballyl groups), wherein R is a monovalent hydrocarbon, said ether preferably being composed of carbon, hydrogen and ether oxygen. Cross-linked copolymers of this invention are obtained with an organohydrosiloxane reactant which has more than two silicon-bonded hydrogens per molecule. Linear or branched (pendant) block copolymers are obtained with a dihydropolyorganosiloxane reactant. Isomerization of the end groups of the present invention occurs not at all or to a slight degree under hydrosilation conditions, but, when it does occur, it is much less than with the corresponding diallyl ethers or polyethers. When it does occur, to insure complete reaction between the ethers and organohydrosiloxanes of the present invention, a slight excess of ether or polyether should therefore be used. The precise molar ratio of $CH_2=C(R)CH_2-$ groups to silanic bonded hydrogen is not narrowly critical. A molar ratio in the range of 0.85 to 1.3 is effective. In the case of producing $(AB)_n$ type copolymers using dihydropolyorganosiloxanes, the preferred molar ratio of $CH_2=C(R)CH_2-$ groups to silanic bonded H is about 1:1 because other ratios will limit the degree of polymerization and molecular weight. As the molar ratio is increased above 1:1, the processes of the present invention become less economical. Also, the excess unreacted ether acts as diluent, thereby reducing the potency or active concentration of the final polymer. Similarly, at ratios below 1:1, the unreacted organohydrosiloxane acts as a diluent.

The organic ether reactants of the present invention contain $CH_2=C(R)CH_2-$ end groups and include the monoethers and the polyethers. They can be represented by the general formula, hereinafter referred to as formula I:

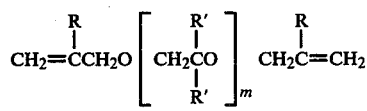

wherein R is a monovalent hydrocarbon group, R' is hydrogen or a monovalent hydrocarbon group and m is an integer of 0 to 100, preferably 1 to 100. Exemplary of the monovalent hydrocarbon groups that are represented by R and R' are the $C_1$–$C_{18}$ alkyl groups, for example, the methyl, ethyl, propyl, isopropyl, butyl, pentyl, hexyl, octyl, decyl, dodecyl, eicosyl and stearyl groups, the aryl groups, for example, the phenyl and naphthyl groups; the aralkyl groups, for example, the benzyl and phenylethyl and groups; the alkaryl groups, for example, the tolyl, n-hexylphenyl groups, and the cycloalkyl groups, for example, the cyclopentyl, cyclohexyl, cycloheptyl and cyclooctyl groups. Preferably, R is an alkyl group. Methyl is the most preferred R group. R and R' individually can be the same or different throughout the ether or polyether molecule. When m is 0, the ether is a simple ether including di(alkallyl) ether, e.g., dimethallyl ether. When m is 1 or more, the ether represented by formula I is a polyether. Preferably, one R' is hydrogen and the other R' is methyl throughout some or all of the —$CH_2C(R')_2O$— units in formula I. That is, such units can comprise oxypropylene units only or combined with other oxyalkylene units. Other preferred polyethers are those containing units in which both R' radicals are hydrogen (i.e. oxyethylene units) as well as units in which one R' is hydrogen and the other R' is methyl (i.e. oxypropylene units). When the polyether contain different —$CH_2C(R')_2O$— units, for example, oxyethylene units and oxypropylene units, such units may be randomly disposed throughout the polyether or can be disposed in one or more blocks of the same units in the polyether. For example, in the case of dimethallyl poly(oxyethyleneoxypropylene) ether, the oxyethylene units and oxypropylene units can be randomly distributed throughout the polyether molecule or they can be disposed in one or more blocks of oxyethylene units connected to one or more blocks of oxypropylene units. Thus, preferred $[CH_2C(R')_2O]_m$ units in formula I can be represented by the formula:

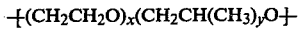

wherein x and y are each integers of 0 to 100 and x+y is an integer of 1 to 100. The copolymers of the present invention may contain, throughout the copolymer molecule, different ether or polyether moieties which are consistent with the above general formula.

Typical examples of polyethers which can be used in the processes of the present invention include dimethallyl ether and the following dimethallyl ethers of polyoxyalkylene glycols:

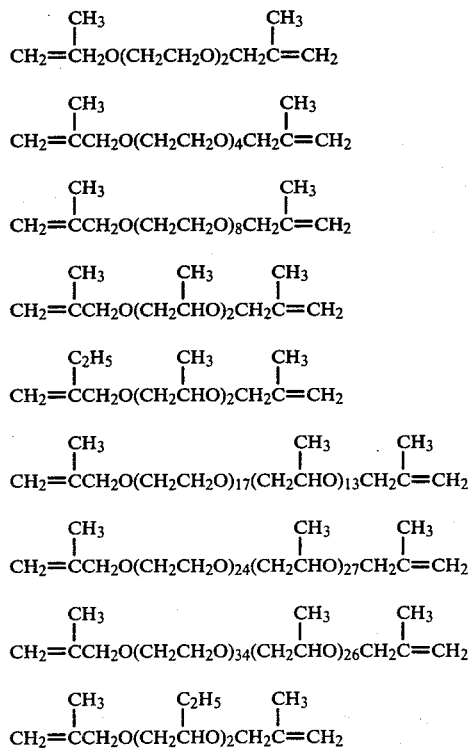

However, it is understood that the present invention is not limited to those polyethers listed but may include any polyether consistent with the general structure shown in formula I.

In addition, the present invention is not limited by the mode of preparation of the di(hydrocarballyl)ether or di(hydrocarballyl) polyether reactant. The di(hydrocarballyl ethers, e.g. di(methallyl)) ether, are readily prepared by known methods. The di(hydrocarballyl) diethers of polyoxylakylene glycols as depicted by formula I can be prepared by: (a) capping the corresponding hydrocarballyl alcohol ($CH_2$=$C(R)CH_2OH$)— started polyether, i.e., the hydrocarballyl monoether of the corresponding polyoxyalkylene glycol, with the desired hydrocarballyl chloride, $CH_2$=$C(R)CH_2Cl$, or (b) capping both ends of the corresponding polyoxyalkylene glycol with the desired hydrocarballyl chloride. For example, the most preferred polyether reactants, the di(methallyl) polyethers, can be prepared either by capping a methallyl alcohol-started polyether with methallyl chloride or by capping both ends of a polyoxyalkylene glycol with methallyl chloride. Other methallyl compounds may be used instead of methallyl chloride, including methallyl bromide or iodide or methally sulfonate esters.

Preparations of hydrocarballyl monoethers of polyoxyalkylene glycols by the addition polymerization of one or more alkylene oxides with a hydrocarballyl alcohol starter in the presence of a basic catalyst are well known. For example, there are two Japanese patents to Toray Industries, Inc., disclosing the base catalyzed preparations of methallyl monoethers of polyoxyalkylene glycols (see Jap. 70, 28,786, Chem. Absts., 74, 14138r (1971)), and, more specifically, methallyl monothers of polyoxyethylene glycols (see Jap. 74, 15,480, Chem. Absts., 82, 17,595j (1975)). Capping procedures are taught in U.S. Pat. No. 3,507,815 which discloses the capping of butyl alcohol-started polyalkylene oxides with methallyl chloride and the resultant butyl methallyl diethers of polyoxyalkylene glycols. The preparation of methallyl alcohol-started, methyl-capped polyethers is taught in U.S. Pat. No. 3,507,932. In U.S. Pat. No. 2,886,600, a methallyl polyether is prepared by reacting a polyether having a hydroxyl end group with isobutylene oxide and then dehydrating the reaction product. The procedures of these Japanese and United States patents can be employed in the present invention to produce the hydrocarballyl monoethers of polyoxyalkylene glycols having one hydroxyl end group and, of course, one hydrocarballyl end group. Thereafter, the hydroxyl end group is reacted, by methods known in the art, with a hydrocarballyl halide to provide the di(hydrocarballyl) diether of the polyoxyalkylene glycol.

Capping procedures wherein one or both hydroxyl end groups of a polyoxyalkylene glycol are reacted, or the hydroxyl end group of monoethers of said glycol, is reacted with an organic halide to provide the corresponding diether are known in the prior art. For example, U.S. Pat. Nos. 3,716,517 and 3,716,518 disclose the conversion of polyalkyleneoxy glycol monoethers into the corresponding monomethallyl ethers by reaction of said monoethers with methallyl bromide in the presence of a base to produce a monomethallyl polyether. While dimethallyl polyethers per se are not disclosed, they can be prepared by reacting methallyl bromide with a polyoxyalkylene glycol (which contains two terminal hydroxyls), or by reacting methallyl bromide with the methallyl monoether of the polyoxyalkylene glycol (which contains one terminal hydroxyl group), utilizing the procedures of these two patents. See, for example, col. 6, lines 19–26 of U.S. Pat. No. 3,716,517. Other di(hydrocarballyl)diethers of polyoxyalkylene glycols starting materials depicted by formula I are prepared by reacting the desired hydrocarballyl halide, $CH_2=C(R)CH_2X$ wherein R is as defined hereinabove and X the sulfonate anion or the halogen atom, such as chlorine, bromine, or iodine, with the desired polyoxyalkylene glycol (having two terminal hydroxyl groups), or with the desired hydrocarballyl monoether of the polyoxyalkylene glycol (having one terminal hydroxyl group), utilizing the procedures taught in U.S. Pat. Nos. 3,716,517 and 3,716,518.

The organohydrosiloxane reactant of the present invention can be a monohydrosiloxane, a dihydrosiloxane or a polyhydrosiloxane, i.e., those siloxanes containing more than two silicon-bonded hydrogen atoms, wherein any valences of silicon not bonded to hydrogen or to oxygen in a silicon to oxygen to silicon bond are bonded to a monovalent hydrocarbon group (such as those given above for R and R') or a monovalent halohydrocarbon group (such as chloroethyl, chlorophenyl, chlorobenzyl, etc.). The substituents on silicon should not interfere with the hydrosilation reaction. The preferred substituent on silicon is the methyl group which is designated herein as Me. Other groups such as chloropropyl, phenylethyl, or chloroisobutyl are illustrative of nonreactive functional groups which may be present as substituents on silicon to adjust the performance of the final product. Cyclic organohydrosiloxanes wherein hydrogen is attached to a silicon atom which either forms part of the ring or which does not form part of the ring can also be used as the organohydrosiloxane reactant in the present invention. Suitable organohydrosiloxane reactants include those having one or more units of the formula:

$$HR''_aSiO_{\frac{3-a}{2}}$$

with or without one or more units of the formula:

$$R''_bSiO_{\frac{4-b}{2}}$$

wherein R" is a monovalent hydrocarbon group or a halogen-substituted monovalent hydrocarbon group as described hereinabove and may be the same or different in the same unit or in the same molecule, a is an integer of 0 to 2, preferably 1, and b is an integer of 0 to 3, preferably 2.

The monohydrosiloxane structures include, but are not limited to:

Me₃SiOSiMe₂H  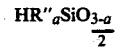  [Me₃SiO]₃SiH

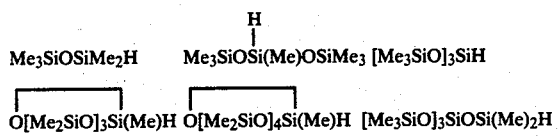

The dihydrosiloxanes of the present invention may have structures wherein the two hydrogen atoms are attached to the same silicon atom or to different silicon atoms of the molecule. Also, the hydrogen atoms may be located either terminally or internally in each molecule. Typical examples of dihydrosiloxanes include the following, but are not limited thereto:

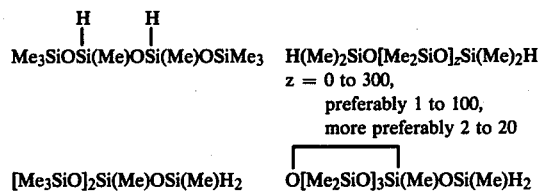

The dihydrosiloxanes most preferred for use in the present invention specifically include those structures so designed as to have two ≡SiH groups in each molecule, i.e., the two silanic hydrogen atoms are attached to different silicon atoms of the dihydrosiloxane molecule. However, the molecules may vary widely in molecular weight and in structure from each other.

The polyhydrosiloxanes containing more than two silicon-bonded hydrogen atoms, may also have any of several structures including blends thereof; such structural types as the following are included but are not inclusive of all the structures operative in the present invention.

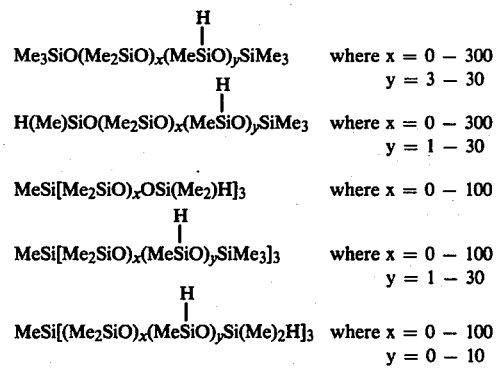

Particularly preferred organohydrosiloxanes are the linear siloxanes having a silicon-bonded hydrogen at each end as shown by the formula:

$$HR''_2SiO[R''_2SiO]_zSiR''_2H$$

in which R" is an unsubstituted or halogen-substituted monovalent hydrocarbon group and z is an integer of 0 to 300, preferably 5 to 50.

The organohydrosiloxane reactant, like the polyether reactant, may thus have a wide variety of structures, meaning that the operation of the processes of this invention is not severely limited by the structure of either reactant, except that the hydrosiloxane reactant molecule must contain at least one reactive ≡SiH group, and the polyether reactant molecule must contain two $CH_2=C(R)CH_2-$ end groups wherein R is a monovalent hydrocarbon group.

The organohydrosiloxane reactants employed in the present invention are reacted with the polyethers of the present invention at addition reaction conditions under which the silicon-bonded hydrogen and the silicon to which it is bonded become bonded respectively to the vicinal carbon atoms comprising the unsaturation of the $CH_2=C(R)CH_2-$ end groups of the polyether. In one broad embodiment the reaction product is a nonhydrolyzable polysiloxane-organic ether block copolymer comprising one or more unit of the formula:

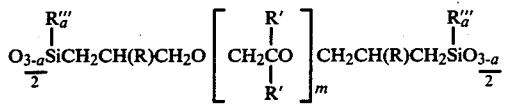

and one or more unit of the formula:

wherein R, R' and R" are as defined above. R''' can be a monovalent hydrocarbon group or a halogen-substituted monovalent hydrocarbon group. R''' can also be the divalent polyether group

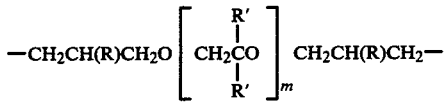

where organohydrosiloxane reactants having at least two silicon-bonded hydrogen atoms are used. In the above formula, R, R', R", and R''' can be the same or different throughout the same unit or molecule. In addition, a is an integer of 0 to 2, preferably 1 or 2, b is an integer of 0 to 3, preferably 1 or 2, and m is an integer of at least 0 or greater, preferably at least 1.

Particularly preferred block copolymers of this invention are those having repeating units of the formula:

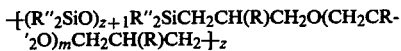

wherein R, R' and R" and z and m are as previously defined and z is an integer of at least one, preferably 5 to 100, more preferably 10 to 50.

Reaction conditions are not narrowly critical. Reaction temperature should be elevated and may be from 50° to 150° C. for example, with 80°–120° C. preferred. The use of a nonreactive solvent for the reactants, such as toluene, is preferred. However, it is not an absolute requirement because certain reactions can be run in the absence of solvent without changing reaction conditions or equipment. A cosolvent is required for reactions where the organohydrosiloxanes and the polyethers form very high viscosity products. The reaction between the organohydrosiloxanes and the polyethers are conveniently catalyzed by neutral, platinum-containing hydrosilation catalyst which are in commercial use or known to be useful by those skilled in the art. Chloroplatinic acid hexahydrate dissolved in 1,2-dimethoxyethane or in isopropanol is not the preferred catalyst in the present invention, because comparatively lower molecular weight copolymers (having lower degrees of polymerization) can result. It is believed that theoretically the chloroplatinic acid hexahydrate catalyst react with the hydrocarballyl groups to end-block them. This effect appears to be more pronounced when polyethers and comparatively higher molecular weight hydrosiloxanes are being copolymerized. When the di(hydrocarballyl) ethers are reacted with the lower molecular weight hydrosiloxanes, the apparent chain limiting effects of chloroplatinic acid catalysts described above do not appear and such non-neutral catalysts are fully useful in these instances. A reduced platinum catalyst of the type described in U.S. Pat. No. 3,220,972 is suitable. Platinum metal, heterogeneously deposited on charcoal, has been found to be the preferred catalyst for the co-reactions of dihydrosiloxanes and dimethallyl polyethers. Catalyst concentrations similar to those used in the prior art are useful. For example, as disclosed in U.S. Pat. No. 3,507,815, useful catalysts may contain from 0.001 to 5.0 weight percent platinum based on the weight of the reactants. In regard to the solvent and catalyst considerations expressed above, the processes of the present invention are not narrowly critical with regard to temperature, solvent, or catalyst, and are not thereby limited.

The processes of the present invention are operable in many versions of standard reaction equipment which have provisions for adequate heating, cooling, agitation, and maintenance of an inert atmosphere. The reaction scale is not limited by size and may range from several grams to several thousand kilograms. Thus, these processes are not narrowly critical with regard to scale or equipment used.

Because of the wide variety of structures which can be prepared by the processes of the present invention, these processes can be used to prepare a wide variety of useful siloxane polyether copolymers. Such copolymers find use, for example, as wetting agents, thickeners, emulsifiers, antifoaming agents, urethane foam stabilizers for foams of various types (rigid, polyester, flexible, polyether, frothed, high resiliency, semiflexible, microcellular, etc.), lubricants, aqueous aerosol shave cream stabilizers, and for other uses known for commercially available siloxane polyether copolymers. These copolymers perform very well in water systems because they are nonhydrolyzable.

The polysiloxanes of the present invention can be tailor-made to fit an intended application by choosing the particular structure of the organohydrosiloxane and the polyether. Thus, the reactants can be chosen to obtain a novel product which finds use as an aqueous wetting agent. Another novel product can be useful as a surfactant for rigid polyurethane foam. Still another novel product can be useful as a surfactant for flexible polyether foam.

The preferred structures are derived from reactions of dihydropolydihydrocarbylsiloxanes having a silicon-bonded hydrogen at each end of each molecule and polyethers having $CH_2=C(R)CH_2$— groups at each end of the polyether molecule, wherein R is a monovalent hydrocarbon group. These novel, high molecular weight, linear, nonhydrolyzable, siloxane-polyether $(AB)_n$ block copolymers are useful in the same areas as their hydrolyzable analogs, i.e., as surfactants for making frothed urethane foam and for making open-celled rigid urethane foam. Because of their hydrostable nature, they are useful in a variety of applications in which they come into contact with water or other protic solvents wherein hydrolyzable linear silicone polyether copolymers would be unstable and, thus, not suitable. Applications entailing water contact include aqueous foaming and thickening agents, water soluble lubricants, aqueous premixes for various types of urethane foams, aqueous emulsions, and the like. Of these preferred structures, the most preferred are derived from co-reactions of dihydropolydimethylsiloxanes and dimethallyl polyethers.

The siloxane polyether copolymers of the present invention can be incorporated in the urethane foam compositions of the prior art as a substitute for and in the same amounts as, the hydrolyzable siloxane polyether foam components used in the prior art compositions. Typical urethane foam compositions into which the copolymers of the present invention may be incorporated are disclosed in U.S. Pat. Nos. 3,280,160, 3,507,815, 3,792,073, 3,793,237, and 3,836,560, herein incorporated by reference. As in U.S. Pat. No. 3,507,815, the amount of the siloxane/polyether block copolymer of the present invention employed as a foam stabilizer can vary over wide limits from about 0.1 weight percent to 10 weight percent or more, based on the total weight of the foam formulation. Preferably, the amount of the siloxane/polyether copolymers present in the foam formulations ranges from about 0.5 weight percent to about 2.0 weight percent based on the total weight of the foam formulation.

The following examples are presented. In the examples, unless otherwise indicated, all temperatures are on the Centigrade scale, all parts and percentages are on a weight basis, Me designates the methyl group, "cp" and "cps" denote centipoises as determined with a Brookfield viscosimeter at 25° C., "g" denotes grams, "$\mu$" denotes microns, "ppm" denotes parts per million, "ml" denotes milliliters, "min" denotes minutes, "mm" denotes millimeters, "GPC" denotes the gel permeation chromotography for determining molecular weight as described in U.S. Pat. No. 3,836,560, "$DP_n$" denotes degree of polymerization of $(AB)_N$ copolymers as determined by dividing the found molecular weight of the copolymer by the molecular weight of the repeating unit (AB) in the copolymer.

EXAMPLE 1

Preparation of a Dimethallyl Polyether

A five-liter, three-necked, round-bottom flask, equipped with mechanical stirrer, nitrogen sparge tube and adapter with termometer and 18" Vigreau column topped by a distillation head, was charged with: (a) 1037.2 g of methallyl alcohol-started oxyalkylene polymer having an oxyalkylene content of about 50% by weight oxyethylene and about 50% by weight oxypropylene, the average formula:

$$CH_2=C(CH_3)CH_2O(C_2H_4O)_{42.3}(C_3H_6O)_{32}H,$$

an aliphatic double bond content of 0.215 meq./g and 0.533% OH and (b) two liters of toluene. The mixture was heated to reflux with a gentle $N_2$ sparge to remove toluene/water azeotrope through the distillation head. After the solution had cooled to room temperature, 22.82 g of NaOCH$_3$ (Fisher, 0.422 equiv.) was added as a solid, and the mixture was heated to remove volatiles, while maintaining an $N_2$ sparge. The distillate was monitored by vapor phase chromatography and distillation was continued until methanol was no longer detected (head temp. 109° C.). The $N_2$ sparge tube was replaced by a pressure equalizing dropping funnel, and 53.95 g of methallyl chloride was added dropwise to the refluxing mixture over 30 min. The mixture was maintained at reflux for an additional 2.5 hr. (heating temperature was 75° C.; pot temperature was 115° C.), then allowed to cool to room temperature. To the milky white mixture was added 27 g of solid NH$_4$Cl, and stirring was continued for 30 min. After addition of Celite (a filter aid manufactured by Johns-Manville, Inc.), the mixture was filtered through a 1/10$\mu$ pad. The colloidal NaCl was not separated, and addition of 50 ml. of H$_2$O failed to cause precipitation. Volatiles were removed on a rotary evaporator to leave a cloudy white liquid which was diluted to 50% solids with toluene, treated with Attacote filter aid, and again filtered through a 1/10$\mu$ pad to give a clear, yellow solution. Additional volatiles were removed on a rotary evaporator (55° C./5 min.) to give a pale yellow, liquid product (C=C, Calcd.: 0.528 meq./g; Found: 0.505 meq./g). The dimethallyl polyether product had an average molecular weight of 3846 and contained about 50% by weight of oxyethylene units and about 50% by weight of oxypropylene units. It is represented by the formula:

$$CH_2=C(CH_3)CH_2O(C_2H_4O)_{42.3}(C_3H_6O)_{32}CH_2C(CH_3)=CH_2.$$

EXAMPLE 2

Preparation of Nonhydrolyzable $(AB)_n$ Copolymer Pursuant To The Invention

A one-liter, three-necked, round-bottom flask, equipped with a mechanical stirrer, a thermometer and a condenser topped by a gas inlet, was flushed with nitrogen and charged with: (a) 153.84 g (0.040 mole) of the dimethallyl-terminated polyether prepared in Example 1, (b) 61.36 g (0.040 mole) of a dihydropolydimethylsiloxane having an average molecular weight of 1534 and represented by the formula:

$$HMe_2SiO(Me_2SiO)_{18}SiMe_2H,$$

(c) 322.9 g of toluene and (d) 4.30 g of 5% platinum on carbon catalyst (Englehard, 400 ppm. Pt). The stirred mixture was quickly heated to 110° C., then allowed to cool to 85° C. and maintained at that temperature for 25 hours. After cooling to room temperature, the viscous mixture was treated with Celite filter aid and filtered through a 1/10$\mu$ pad to yield 474.3 g of a clear, gray solution of the product. The product had a Brookfield viscosity of 3200 cp at 25° at 39.1% solids in toluene and showed no evolution of hydrogen when treated with alcoholic KOH which showed that it contained no silivon-bonded hydrogen. The product, designated Surfactant A, had a molecular weight of greater than 100,000 by GPC and a degree of polymerization of greater than 18.8, and can be represented by repeating units of the average formula:

$$+(Me_2SiO)_{19}Me_2SiCH_2CH(CH_3)CH_2O(C_2H_4O)_{42.3}(C_3H_6O)_{32}CH_2CH(CH_3)CH_2+_{18.8}$$

This process and product are contrasted with the process and product of Example 16 of U.S. Pat. No. 2,970,150 wherein diallylether was reacted with Me$_3$SiO(EtSiHO)$_2$SiMe$_3$ in equimolar amounts in the presence of platinum on gamma alumina. The product of Example 16 of said patent still contained 1.4 cc/g hydrolyzable hydrogen (.e., silicon-bonded hydrogen) even after the material was heated at high temperatures (150°–160° C. and 200° C.) for lengthy periods in an attempt to overcome isomerization and force completion of the reaction.

EXAMPLE 3

Comparison of Nonhydrolyzable $(AB)_n$ Copolymer of Example 2 With A Prior Art Hydrolyzable $(AB)_n$ Copolymer Surfactant A was compared to a commercial sample of a hydrolyzable $(AB)_n$ copolymer of equivalent molecular weight. The commercial copolymer is the reaction product of (a) about 0.05 mole of a polydimethylsiloxane having an average molecular weight of about 1,500 and (b) about 0.05 mole of a polyoxyethylene polyoxy-1,2-propylene glycol comprising 50 weight percent ethylene oxide and 50 weight percent propylene oxide and having a molecular weight of about 3,000. Processes for making linear hydrolyzable copolymers of this type are disclosed, for example, in U.S. Pat. Nos. 3,836,560 (Examples 9, 15 and 16) and 3,957,842. The commercial copolymer is designated Surfactant B and has an average molecular weight (GPC) in excess of 160,000 and a degree of polymerization in excess of 36. The foam formulations used were a typical frothed urethane foam formulation of the type described in U.S. Pat. No. 3,792,073 and an open-celled rigid urethane foam formulation of the type described in U.S. Pat. No. 3,793,237. In both formulations, Surfactant A was equivalent to Surfactant B in performance and had the added advantage of being hydrolytically stable.

EXAMPLE 4

Preparation of Nonhydrolyzable $(AB)_n$ Copolymer Pursuant to the Prior Art

This example is found in Example 1 of U.S. Pat. No. 3,836,560.

Into a 500 ml. three-neck flask, equipped with a mechanical stirrer, condenser, thermometer and nitrogen inlet were placed 54.0 g (0.02 mole) of diallyl diether of a polyoxyethylene-polyoxy-1,2-propylene glycol comprising about 35 percent ethylene oxide and about 65 percent propylene oxide by weight and having an average molecular weight of 2700, 150 ml. of toluene and 20 ppm of Pt as chloroplatinic acid. To this mixture 24.48 g (0.02 mole) of SiH-endblocked polydimethylsiloxane having an average molecular weight of 1424 was added slowly at such a rate as to maintain the temperature between 80°–100° C. The completion of the reaction was evidenced by a negative $AgNO_3$ test of SiH. The reaction mixture was then neutralized with 10 g of $NaHCO_3$, filtered and after solvent removal by rotary evaporation at 50° C./1 Hg mm there was obtained 76.0 g, 93% of the desired $(AB)_n$ block copolymer product. This liquid product had a viscosity of about 12,100 cps. at room temperature. The resulting block copolymer had an average molecular weight of 36,000 as established by gel permeation chromotography (GPC) and can be represented as having repeating units of the average formula:

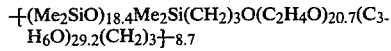

This block copolymer had a $\overline{DP_n}$ of only 8.7 compared to a $\overline{DP_n}$ of 18.8 for the block copolymer of Example 2 which was made pursuant to this invention prepared from a dimethallyl polyether and a similar SiH endblocked polydimethylsiloxane in the presence of a platinum on carbon catalyst. The relatively low degree of polymerization and relatively low average molecular weight of this prior art copolymer and the absence of silicon-bonded hydrogen coupled with the art recognized isomerizability of allyl groups under hydrosilation conditions, suggest that the silicon-bonded hydrogen atoms are consumed in side reactions such as with water inadvertently present in the system or in the chloroplatinic acid in the hexahydrate form or in other side reactions.

EXAMPLES 5–10

Preparation of Nonhydrolyzable $(AB)_n$ Copolymers Pursuant to the Prior Art

Following the reaction procedure outlined in Example 4 above, a series of six other high molecular weight linear nonhydrolyzable siloxane-polyoxyalkylene $(AB)_n$ block copolymers (Examples 5 through 10) were prepared from a series of dihydropolydimethylsiloxanes and diallyl-terminated polyethers as identified in Table I below. In each case, the silicone and polyether were reacted on a mole for mole basis. The average molecular weight of the products as determined by GPC and the weight percent of dimethylsiloxane (silicone) blocks in the products as determined by calculated are given in Table I also. Examples 5–10 correspond to Examples 2 through 7 of U.S. Pat. No. 3,836,560. The data for Example 4 hereinabove is also given in Table II for ease of comparisons. These copolymers can be characterized as having repeating units of the formula:

wherein z is about 7 to about 30, x is about 20 to about 33, y is about 25 to about 32 and n is about 7.2 to about 14.12. The specific values for n, x, y and z for each block copolymer are given in Table I.

As shown by Table III of U.S. Pat. No. 3,836,560 the copolymers prepared pursuant to Examples 4–10 (i.e., Examples 1–7 of the patent), when used as surfactants for mechanically frothed foams, were not capable of producing foams having the low densities of foams prepared with the commercial copolymer surfactant (Surfactant B; made pursuant to Examples 9, 15 and 16 of the patent). Also, the copolymers prepared pursuant to Examples 4–10 have not been found to produce open celled polyurethane foams when used as surfactants in foam formulations made in accordance with U.S. Pat. No. 3,793,237.

TABLE I

| | Reactants | | | | | | | $(AB)_n$ Product | | |
|---|---|---|---|---|---|---|---|---|---|---|
| | Silicone,[1] | | Polyether[2] | | | | | | % Silicone | |
| Ex. No. | avg. mol. wt. | z | avg. mol. wt. | x | y | % oxyethylene | % oxypropylene | GPC, avg. mol. wt. | Blocks in Product | n $DP_n$ |
| 4 | 1,424 | 17.4 | 2,700 | 20.7 | 29 | 35 | 65 | 36,000 | 35 | 8.7 |
| 5 | 700 | 7.6 | 2,700 | ↓ | ↓ | 35 | 65 | 48,000 | 21 | 14.12 |
| 6 | 2,300 | 29.3 | 2,700 | ↓ | ↓ | 35 | 65 | 36,000 | 46 | 7.2 |
| 7 | 1,510 | 18.6 | 2,940 | 22.6 | 31.9 | 35 | 65 | 38,000 | 34 | 8.54 |
| 8 | 1,700 | 21.2 | 3,000 | 33 | 25 | 50 | 50 | 48,000 | 36 | 10.21 |
| 9 | 1,700 | ↓ | 3,000 | ↓ | ↓ | 50 | 50 | 51,000 | 36 | 10.85 |

TABLE I-continued

| | Reactants | | | | | | | (AB)$_n$ Product | | |
|---|---|---|---|---|---|---|---|---|---|---|
| | Silicone,[1] | | Polyether[2] | | | | | | % Silicone | |
| Ex. No. | avg. mol. wt. | z | avg.mol. wt. | x | y | % oxy- ethylene | % oxypro- pylene | GPC, avg. mol. wt. | Blocks in Product | n DP$_n$ |
| 10 | 1,700 | ↓ | 3,000 | ↓ | ↓ | 50 | 50 | 56,000 | 36 | 11.91 |

[1]Silicone structure: HSiMe$_2$O(Me$_2$SiO)$_z$Si(Me)$_2$H, where z is an integer with values to give the designated molecular weights.
[2]Polyether structure: CH$_2$=CHCH$_2$O(C$_2$H$_4$O)$_x$(C$_3$H$_6$O)$_y$—CH$_2$CH=CH$_2$, where x and y are integers with values that give the designated molecular weights and oxyalkylene content.

EXAMPLES 11–24

Preparation of Nonhydrolyzable (AB)$_n$ Block Copolymers Pursuant To This Invention Following the reaction procedure described in Example 2, a series of nonhydrolyzable (AB)$_n$ block copolymers were prepared from a series of dihydropolydimethylsiloxanes and dimethallyl-terminated polyethers as identified in Table II below. The silicone and the polyether were reacted on a mole for mole basis. The viscosities of the products and the weight percent of dimethylsiloxane (silicone) blocks in the products as determined by calculation are given in Table II. The products can be characterized as having repeating units of the formula:

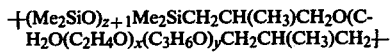

wherein z is a number from about 2 to about 20, x is a number from about 15 to about 35 and y is a number from about 0 to about 25. By analogy with the product of Example 2, the $\overline{DP_n}$ of the products of Examples 11 through 24 were in the range of 18 to 25. Each of the products of Examples 11–24 showed no evolution of hydrogen when treated with alcoholic KOH which showed that they contained no silicon-bonded hydrogen.

dropolydimethylsiloxane as that used in Example 2 and 53.80 g toluene. The stirred mixture was heated to 85° C. and 70 ppm Pt as chloroplatinic acid was added. After maintaining 85° C. for 7 hrs., the mixture was cooled to room temperature, neutralized with NaHCO$_3$ and treated with Celite filter aid. After filtration through a 2–4μ pad, then through a 1/50μ pad, a viscous, yellow solution was obtained. This product had an average molecular weight of about 45,000 as determined by gel permeation chromatography and a $\overline{DP_n}$ of about 8.5. This example, when compared with Example 2, illustrates the advatanges of the netral platinum catalysts, e.g., platinum on carbon, platinum on alumina and the like as compared to chloroplatinic acid catalyst which may react with one or the other or both of the reactants to end-block or prematurely terminate the polymerization. The silicon-bonded hydrogen content of the product was negligible.

EXAMPLE 26

Preparation of Nonhydrolyzable (AB)$_n$ Copolymer Pursuant To This Invention A 100 ml. three-necked, round-bottom flask, equipped with a magnetic stirrer, a thermometer, a condenser, and nitrogen flow valves, was flushed with nitrogen and charged with 13.4 g (0.1 mole) of 1,1,3,3-tetramethyldisiloxane, 12.6 g (0.1 mole) of dimethallyl ether and 10 ml. of toluene. Heat was applied to 85° C.

TABLE II

| Ex. No. | Silicone avg.mol. wt. (1) | z | Polyether avg.mol. wt. (2) | x | y | % Oxyethylene (3) | Product Visocosity (4) | Product Percent Silicone | n DP$_n$ |
|---|---|---|---|---|---|---|---|---|---|
| 11 | 540 | 5.5 | 1,500 | 15.6 | 11.8 | 50 | 123 | 26 | |
| 12 | 900 | 10.4 | 1,500 | ↓ | ↓ | 50 | 190 | 37 | |
| 13 | 1,270 | 15.4 | 1,500 | ↓ | ↓ | 50 | 274 | 46 | |
| 14 | 300 | 2.2 | 1,500 | 31.2 | 0 | 100 | 59 | 17 | |
| 15 | 540 | 5.5 | 1,500 | ↓ | ↓ | 100 | 87 | 26 | |
| 16 | 870 | 10.0 | 1,500 | ↓ | ↓ | 100 | 102 | 37 | |
| 17 | 1,270 | 15.4 | 1,500 | ↓ | ↓ | 100 | 230 | 46 | |
| 18 | 900 | 10.4 | 3,000 | 32.7 | 24.8 | 50 | 12,000 | 23 | |
| 19 | 1,270 | 15.4 | 3,000 | ↓ | ↓ | 50 | 7,500 | 30 | |
| 20 | 540 | 5.5 | 3,000 | 49.0 | 12.4 | 75 | 263 | 15 | |
| 21 | 900 | 10.4 | 3,000 | ↓ | ↓ | 75 | 2,800 | 23 | |
| 22 | 1,270 | 15.4 | 3,000 | ↓ | ↓ | 75 | 4,000 | 30 | |
| 23 | 1,530 | 18.9 | 3,000 | ↓ | ↓ | 75 | 6,000 | 34 | |
| 24 | 540 | 5.5 | 6,000 | 133.5 | 0 | 100 | Wax | 8 | |

(1) Silicone structure: HSiMe$_2$O(Me$_2$SiO)$_z$ Me$_2$SiH, where z is an integer with values to give the designated molecular weights.
(2) Polyether structure: CH$_2$=C(CH$_3$)CH$_2$O(C$_2$H$_4$O)$_x$—(C$_3$H$_6$O)$_y$CH$_2$C(CH$_3$)=CH$_2$, where x and y are integers with values to give the appropriate molecular weights and oxyalkylene content.
(3) Oxyethylene content represents the weight percent of ethylene oxide in the polyether reactant.
(4) Viscosity cp at 25° C. of 40% solution in toluene of the product block copolymer product.

EXAMPLE 25

Preparation of Nonhydrolyzable (AB)$_n$ Copolymer Pursuant To This Invention An apparatus similar to that used in Example 2 was charged with 38.46 g (0.01 mole) of the dimethallyl-terminated polyether prepared according to Example 1, 15.34 g (0.01 mole) of the same kind of dihyand 0.2 ml. of a platinum catalyst solution prepared according to U.S. Pat. No. 3,220,972 (from H$_2$PtCl$_6$ and octyl alcohol) was added. Reaction temperature rose exothermically to 135° C. in 22 min., followed by heating at 130°–135° C. for an additional 38 min. The reaction mixture was vacuum stripped up to 140° C. at 0.3 mm. vacuum yielding a viscous product which showed a negative test for residual silicon-bonded hydrogen atoms when treated with alcoholic KOH. The molecular weight of the product was 5,800 by gel permeation chromatography, corresponding to a degree of polymerization ($\overline{DP}_n$) of 22.3. The product can be characterized as having repeating units of the formula:

—[Me₂SiOMe₂SiCH₂CH(CH₃)C-
H₂OCH₂CH(CH₃)CH₂]—

EXAMPLE 27

Preparation of Nonhydrolyzable (AB)$_n$ Copolymer Pursuant To The Prior Art

In the apparatus of Example 26, were charged 13.4 g (0.1 mole) of 1,1,3,3-tetramethyldisiloxane, 9.8 g (0.1 mole) of diallyl ether, and 15 ml. of toluene. The solution was heated to 58° C. and 0.2 ml. of the Pt catalyst solution of Example 26 was added. There was a violent exothermic reaction with pot temperature rising to 121° C. in 6 min. followed by heating at 113°–121° C. for 2½ hrs. The reaction mixture was vacuum stripped up to 137° C. at 0.3 mm vacuum, yielding a fluid which showed a strong positive test for residual silicon-bonded hydrogen atoms when treated with alcoholic KOH. The fluid had a molecular weight of 1,950 by gel permeation chromatography, corresponding to a degree of polymerization ($\overline{DP}_n$) of 8.4. Both the final molecular weight and $\overline{DP}_n$ were considerably below those of the product of Example 26. The presence of unreacted silicon-bonded hydrogen in the fluid produced by this example and the low molecular weight and low $\overline{DP}_n$ for the fluid, demonstrates incomplete reaction probably due to isomerization of the allyl groups of the diallyl ether reactant to relatively non-reactive propenyl groups.

What is claimed is:

1. A process of making a nonhydrolyzable siloxane-organic ether block copolymer having a degree of polymerization of at least 15 and containing a ≡SiC≡ linkage connecting the siloxane and ether blocks, comprising reacting an organic ether having two CH₂=C(R)CH₂— end groups wherein R is a monovalent hydrocarbon group with an organohydrosiloxane having at least one silicon-bonded hydrogen at addition reaction conditions under which said silicon-bonded hydrogen and the silicon to which it is bonded become bonded respectively to the vicinal carbon atoms comprising the unsaturation of each end group of said ether.

2. The process as claimed in claim 1 wherein said reacting step is carried out in the presence of a neutral platinum catalyst.

3. The process as claimed in claim 2 wherein said ether is a polyether of the general formula:

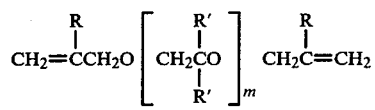

wherein R is a monovalent hydrocarbon group, R' is a hydrogen atom or a monovalent hydrocarbon group, and m is an integer of at least one, the R and R' radicals may be the same or different throughout the polyether molecule.

4. The process as claimed in claim 3 wherein R is methyl and each R' is hydrogen or methyl.

5. The process as claimed in claim 4 wherein said units range in number from 1 to 100.

6. The process as claimed in claim 4 wherein the [CH₂C(R')₂O]$_m$ units have the formula:

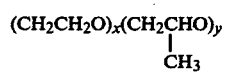

(CH₂CH₂O)$_x$(CH₂CHO)$_y$
　　　　　　　　　|
　　　　　　　　 CH₃ wherein x and y are each integers of 0 to 100 and x+y is an integer of 1 to 100.

7. The process as claimed in claim 6 wherein said organohydrosiloxane is an organodihydrosiloxane.

8. The process as claimed in claim 7 wherein said organodihydrosiloxane has the formula H(R")₂SiO[(R")₂SiO]$_z$Si(R")₂H wherein R" is a monovalent hydrocarbon group or a monovalent halohydrocarbon group and z is an integer of 0 to 300.

9. The process as claimed in claim 8 wherein the reaction takes place in a solvent for the organodihydrosiloxane and the polyether.

10. The process as claimed in claim 8 wherein the reaction is catalyzed by a platinum on carbon hydrosilation catalyst.

11. The process of claim 8 wherein the reaction temperature is from about 50° to about 150° C.

12. A nonhydrolyzable polysiloxane-organic ether block copolymer having a degree of polymerization of at least 15 and containing at least one divalent ether block bonded to silicon of at least two polysiloxane blocks, any valences of silicon not bonded to oxygen of a ≡SiOSi≡ linkage or to said divalent ether block being bonded to a monovalent hydrocarbon group or to a monovalent halohydrocarbon group, said divalent ether block or blocks having the formula:

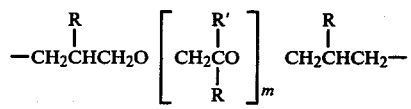

wherein R is a monovalent hydrocarbon group, R' is hydrogen or a monovalent hydrocarbon group, and m is an integer of 0 or greater and wherein R and R' may be the same or different throughout the same ether block or block copolymer molecule and the —CH₂CH(R')₂O— units may be the same or different throughout the same ether block.

13. A block copolymer as claimed in claim 12 having a degree of polymerization of at least 18.

14. A block copolymer, as claimed in claim 12 wherein R is methyl and m is an integer of 1 to 100.

15. A nonhydrolyzable, polysiloxane-polyether block copolymer comprising one or more unit of the formula:

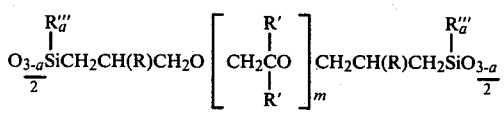

and one or more unit of the formula:

wherein R is a monovalent hydrocarbon, R' is hydrogen or a monovalent hyrocarbon group, R" is a monovalent hydrocarbon group or a halogen-substituted monovalent hydrocarbon group, R''' is a monovalent hydrocarbon group, a halogen substituted monovalent hydrocarbon group, or

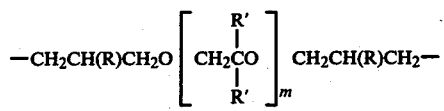

and R, R', R" and R''' can be the same or different throughout the same unit or molecule, a is an integer of 0 to 2, b is an integer of 0 to 3, and m is an integer of at least 1.

16. A block copolymer as claimed in claim 15 wherein R is methyl and R' is hydrogen or methyl, a is 1 and b is 2.

17. A block copolymer as claimed in claim 12 comprising repeating units of the formula:

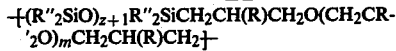

wherein R, R' and m are as defined in claim 12, R" is a monovalent hydrocarbon group or a halogen-substituted monovalent hydrocarbon group, and z is an integer of 0 to 300.

18. A block copolymer as claimed in claim 12 comprising repeating units of the formula:

wherein z is a number from about 2 to about 20, x is a number from about 15 to about 135 and y is a number from about 0 to about 25.

19. A block copolymer as claimed in claim 17 comprising repeating units of the formula:

20. A block copolymer as claimed in claim 12 having repeating units of the formula:

* * * * *